United States Patent [19]
Tabei et al.

[11] Patent Number: 5,237,033
[45] Date of Patent: Aug. 17, 1993

[54] PREPARATION OF POLYSILANES

[75] Inventors: Eiichi Tabei; Shigeru Mori, both of Kawasaki; Akira Hayashida, Higashimurayama; Motoo Fukushima, Kawasaki, all of Japan

[73] Assignee: Shin-Etsu Chemical Co., Ltd., Tokyo, Japan

[21] Appl. No.: 850,641

[22] Filed: Mar. 13, 1992

[30] Foreign Application Priority Data

Mar. 15, 1991 [JP] Japan .................................. 3-75574
Mar. 15, 1991 [JP] Japan .................................. 3-75575

[51] Int. Cl.$^5$ .............................................. C08G 77/06
[52] U.S. Cl. ........................................ 528/19; 528/10; 528/14; 528/31; 556/430
[58] Field of Search ................... 528/19, 10, 31, 14; 556/430

[56] References Cited

U.S. PATENT DOCUMENTS

| | | | |
|---|---|---|---|
| 4,962,175 | 10/1990 | Bujalski et al. | 528/19 |
| 4,962,176 | 10/1990 | Bujalski et al. | 528/19 |
| 5,128,430 | 7/1992 | Tabei et al. | 556/430 |
| 5,159,043 | 10/1992 | Mori et al. | 556/430 |
| 5,162,477 | 11/1992 | Mori et al. | 528/10 |

Primary Examiner—Melvyn I. Marquis
Attorney, Agent, or Firm—Millen, White, Zelano & Branigan

[57] ABSTRACT

Polysilanes are synthesized by reacting dihalosilanes in the presence of alkali metal particles while using copper powder, cuprous oxide, cupric oxide, or an organic copper compound as a catalyst. There are obtained high molecular weight polysilanes in high yields.

15 Claims, 3 Drawing Sheets

PREPARATION OF POLYSILANES

This invention relates to a method for preparing high molecular weight polysilanes.

BACKGROUND OF THE INVENTION

It is almost the only prior art polysilane synthesis method to condensate dichlorosilane with the aid of metallic sodium. This method, however, has several problems including difficulty to control reaction, low yields of high molecular weight polysilanes, and formation of insoluble polymers.

The following polysilane synthesis methods were proposed to obviate these problems. (1) Polysilane is prepared by subjecting $RSiH_3$ to dehydrogenation condensation with the aid of $Cp_2MR_2$ type complex wherein M is Ti or Zr. See J. F. Harrod, ACS, Polym. Prepr., 28, 403 (1987). This method can produce polysilanes having a degree of polymerization of about 20, but fails to produce polysilanes having a higher degree of polymerization. (2) Another method is to prepare polysilane through anionic polymerization using masked disilene protected with biphenyl. See Sakurai et al., Proceedings of Japanese Chemical Society 56th Spring Meeting (1988), 1IVO3. This method is not suited for commercial manufacture since the starting material, masked disilene is difficult to synthesize. (3) An improvement in the conventional synthesis method was attempted by adding crown ethers. See Fujino et al., Proceedings of Japanese Chemical Society 56th Spring Meeting (1988), 1IVB1. The addition of crown ethers was effective in promoting the reaction, but the final yield of high molecular weight polysilane was little improved as compared with the conventional method.

Therefore, an object of the present invention is to provide a polysilane preparing method capable of readily producing high molecular weight polysilanes in high yields.

SUMMARY OF THE INVENTION

Investigating the process wherein a dihalosilane of the formula (1):

(1)

wherein $R^1$ and $R^2$ are independently selected from the group consisting of a hydrogen atom and a monovalent hydrocarbon group, and X is a halogen atom, is reacted in the presence of an alkali metal to form a polysilane of the formula (2):

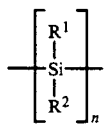
(2)

wherein $R^1$ and $R^2$ are as defined above and n is an integer of at least 6, the inventors have found that a high molecular weight polysilane can be readily produced by reacting the dihalosilane, preferably at a temperature of 100° C. or higher while using copper powder, copper (I) oxide, copper (II) oxide or an organic copper compound as a catalyst. At the same time, formation of insoluble polymers is suppressed and the yield of the polysilane is improved.

Therefore, the present invention provides a method for preparing a polysilane, comprising the step of reacting a dihalosilane of formula (1) in the presence of an alkali metal using a catalyst selected from the group consisting of copper powder, copper (I) oxide, and copper (II) oxide or an organic copper compound catalyst to form a polysilane of formula (2).

DETAILED DESCRIPTION OF THE INVENTION

Figure 1:
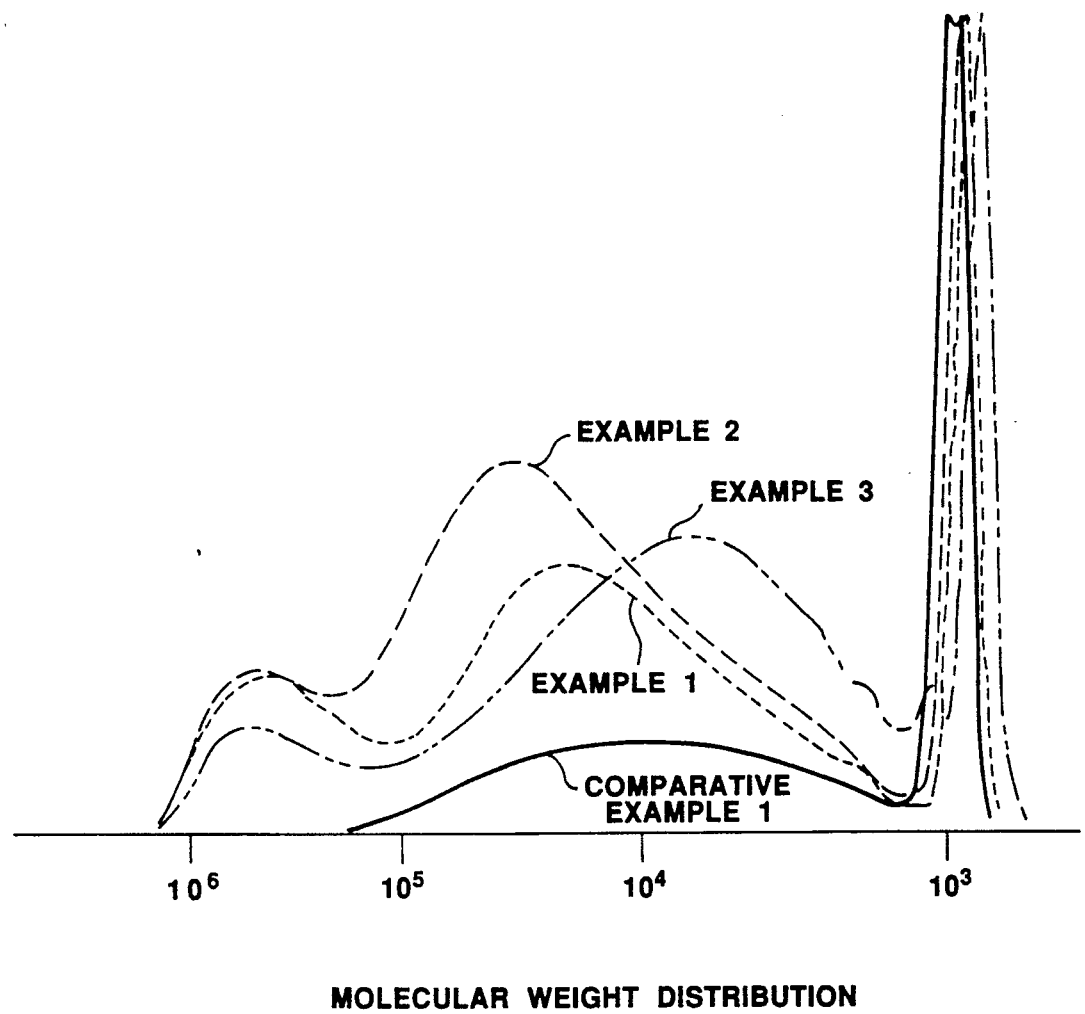
FIG. 1 is a chart showing the molecular weight distribution of polymers obtained in Examples 1-3 using copper catalysts.

The method of the present invention uses as a starting material a dihalosilane of formula (I).

In formula (1), $R^1$ and $R^2$, which may be identical or different, are a hydrogen atom or a monovalent hydrocarbon group, preferably having 1 to 12 carbon atoms, more preferably 1 to 6 carbon atoms, for example, such as substituted or unsubstituted alkyl, alkenyl and aryl groups (e.g., methyl, ethyl, propyl and phenyl). X is a halogen atom such as chlorine. The dihalosilanes may be used alone or in admixture of two or more.

The dihalosilane is reacted in the presence of an alkali metal such as lithium and sodium. The alkali metal is preferably in fine particulate form and used in an amount of about 2.0 to 2.5 mol, especially about 2.0 to 2.1 mol per mol of the dihalosilane.

According to the present invention, the reaction of dihalosilane in the presence of an alkali metal uses copper powder, copper (I) oxide or copper (II) oxide as a catalyst. The copper powder preferably has a particle size of about 0.1 to 10 μm, especially 0.1 to 1 μm because coarse particles of more than 10 μm would provide less catalysis. The copper catalyst may be added to the reaction system either by adding the catalyst to the dihalosilane and then adding the mixture to alkali metal fine particles or by adding the catalyst to alkali metal fine particles and then adding the mixture to the dihalosilane. The copper catalyst is preferably used in an amount of about $1 \times 10^{-6}$ to 10% by weight, especially $1 \times 10^{-4}$ to 5% by weight based on the dihalosilane.

Alternatively, the reaction of dihalosilane in the presence of an alkali metal uses an organic copper compound as a catalyst. Examples of the organic copper compound include copper chelates such as copper (II) bis(acetylacetonato), and copper organic acid salts such as copper (II) benzoate, copper (II) gluconate, copper (II) oleate, and copper (II) octylate, with the copper (II) bis(acetylacetonato) being preferred. The organic copper compound may be added to the reaction system either by adding the organic copper compound to the dihalosilane and then adding the mixture to alkali metal fine particles or by adding the organic copper compound to alkali metal fine particles and then adding the mixture to the dihalosilane. The organic copper compound is preferably used in an amount of about $1 \times 10^{-6}$ to 10% by weight, especially $1 \times 10^{-4}$ to 5% by weight based on the dihalosilane.

The reaction of dihalosilane is preferably effected in an inert solvent such as toluene, xylene, decane and dodecane. Preferably, a reactor is charged with an inert solvent and alkali metal fine particles, and the contents are agitated. The reaction temperature is preferably at least 100° C., more preferably from 110° to 150° C. Metallic sodium cannot exist as fine particles at temperatures below 100° C. When the dihalosilane is added to the reaction system at a temperature of 100° C. or higher with stirring, exothermic reaction takes place. The reaction is complete when substantially the entire amount of alkali metal is consumed. The reaction mixture is post treated in a conventional manner and the polymer is collected by fractional precipitation. There is obtained a polysilane of formula (2) having a molecular weight of 200,000 to 1,000,000 in high yields.

(2)

In formula (2), $R^1$ and $R^2$ are as defined above and n is an integer of at least 6.

It is possible to effectively suppress formation of insoluble matter during the post treatment of the reaction mixture by adjusting the reaction mixture to pH 3 to 7 before or after alcohol addition for deactivating the alkali metal, and washing the mixture with water for removing the salt.

EXAMPLE

Examples of the present invention are given below by way of illustration and not by way of limitation.

Examples 1-3 & Comparative Example 1

A four necked flask was charged with 4.8 grams of metallic sodium particles and 60 grams of xylene. A sodium dispersion was formed by heating at 135° C. and agitating the mixture. To the dispersion was added 0.064 grams (0.34% by weight) of copper powder having a particle size of 0.2 μm. With stirring and heating at a temperature of 135° C., 19.1 grams of phenylmethyldichlorosilane was added dropwise to the dispersion. Exothermic reaction took place, turning the solution violet. The sodium seemed to disappear after heating and stirring continued for 6 hours. The reaction solution was cooled down to room temperature, completing the reaction.

About 5 ml of methanol was added to the reaction solution to deactivate the metallic sodium. The reaction solution was washed with water five times (about 100 ml of water in total) for dissolving and separating the sodium chloride resulting from the exothermic reaction. Then the organic layer was taken out and concentrated. Fractional precipitation from toluene/acetone system provided a polysilane of the formula (3):

(3)

having a weight average molecular weight of 635,000 in a yield of 20%.

Polysilanes were synthesized by varying the amount of copper powder added as shown in Table 1. The yield and weight average molecular weight (Mw) of polysilanes collected by fractionation are also reported in Table 1. These synthesized polymers had molecular weight distributions as shown in FIG. 1.

TABLE 1

|  | Cu powder (wt %) | Mw | Yield (%) |
| --- | --- | --- | --- |
| Comparative Example 1 | 0 | 500,000 | 0 |
| Example 1 | 0.17 | 495,000 | 19 |
| Example 2 | 0.34 | 635,000 | 20 |
| Example 3 | 3.4 | 535,000 | 10 |

EXAMPLE 4

Polysilane was synthesized by the same procedure as Example 1 except that 0.071 grams of $Cu_2O$ was added instead of 0.064 grams of copper powder as the copper catalyst. The polysilane had a weight average molecular weight of 780,000 and a yield of 19%.

EXAMPLE 5

Polysilane was synthesized by the same procedure as Example 1 except that 0.04 grams of CuO was added instead of 0.064 grams of copper powder as the copper catalyst. The polysilane had a weight average molecular weight of 548,000 and a yield of 18%.

COMPARATIVE EXAMPLE 2

Polysilane was synthesized by the same procedure as Example 1 except that the copper powder as the copper catalyst was omitted and the reaction temperature was 132° C. The polysilane had a weight average molecular weight of 100,000 and a yield of 5%.

It is evident that high molecular weight polysilanes are synthesized in high yields by using copper powder, cuprous oxide or cupric oxide in reaction of dihalosilanes in the presence of alkali metals.

EXAMPLES 6-8

A four-necked flask was charged with 4.8 grams of metallic sodium particles and 60 grams of xylene. A sodium dispersion was formed by heating at 135° C. and agitating the mixture. To the dispersion was added 0.13 grams of copper (II) bis(acetylacetonato). With stirring and heating at a temperature of 135° C., 19.1 grams of phenylmethyldichloro. silane was added dropwise to the dispersion. Exothermic reaction took place, turning the solution violet. The sodium seemed to disappear after heating and stirring continued for 6 hours. The reaction solution was cooled down to room temperature, completing the reaction.

About 5 ml of methanol was added to the reaction solution to deactivate the metallic sodium. The reaction solution was washed with water five times (about 100 ml of water in total) for dissolving and separating the sodium chloride resulting from the exothermic reaction. Then the organic layer was taken out and concentrated.

Fractional precipitation from toluene/acetone system provided a polysilane of formula (3) having a weight average molecular weight of 451,000 in a yield of 20%.

Figure 2:
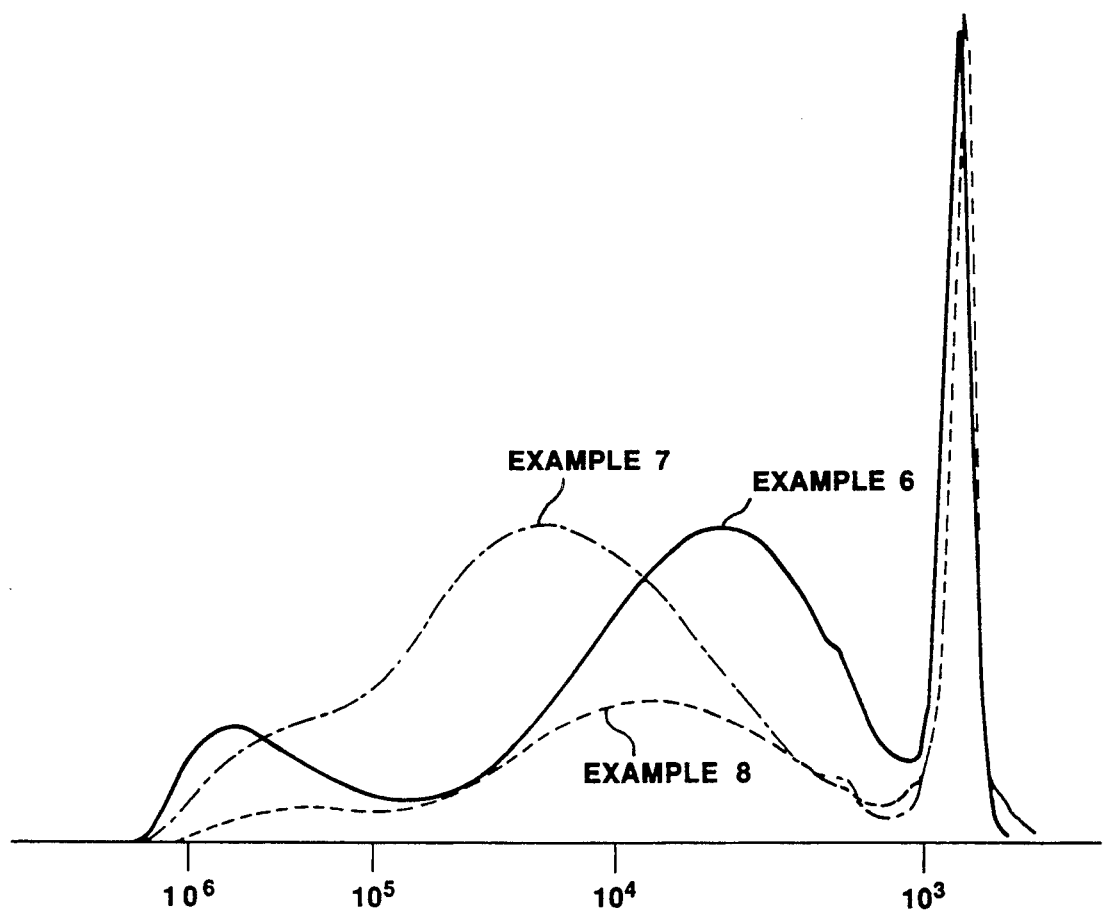
FIG. 2 is a chart showing the molecular weight distribution of polymers obtained in Examples 6-8 using organic copper catalysts.

Polysilanes were synthesized by varying the type and amount of organic copper compound added as shown in Table 2. The yield and weight average molecular weight (Mw) of polysilanes collected by fractionation are also reported in Table 2. These synthesized polymers had molecular weight distributions as shown in FIG. 2.

TABLE 2

| | Organic copper compound | | | |
|---|---|---|---|---|
| | Type | Amount (wt %) | Mw | Yield (%) |
| Example 6 | Cu(AcAc)$_2$ copper (II) bis(acetylacetonato) | 0.7 | 451,000 | 15 |
| Example 7 | Cu(C$_7$H$_4$O$_2$)$_2$ copper (II) benzoate | 0.8 | 411,000 | 11 |
| Example 8 | Cu(C$_6$H$_{11}$O$_7$)$_2$ copper (II) gluconate | 1.2 | 281,000 | 6 |

COMPARATIVE EXAMPLES 3-8

Figure 3:
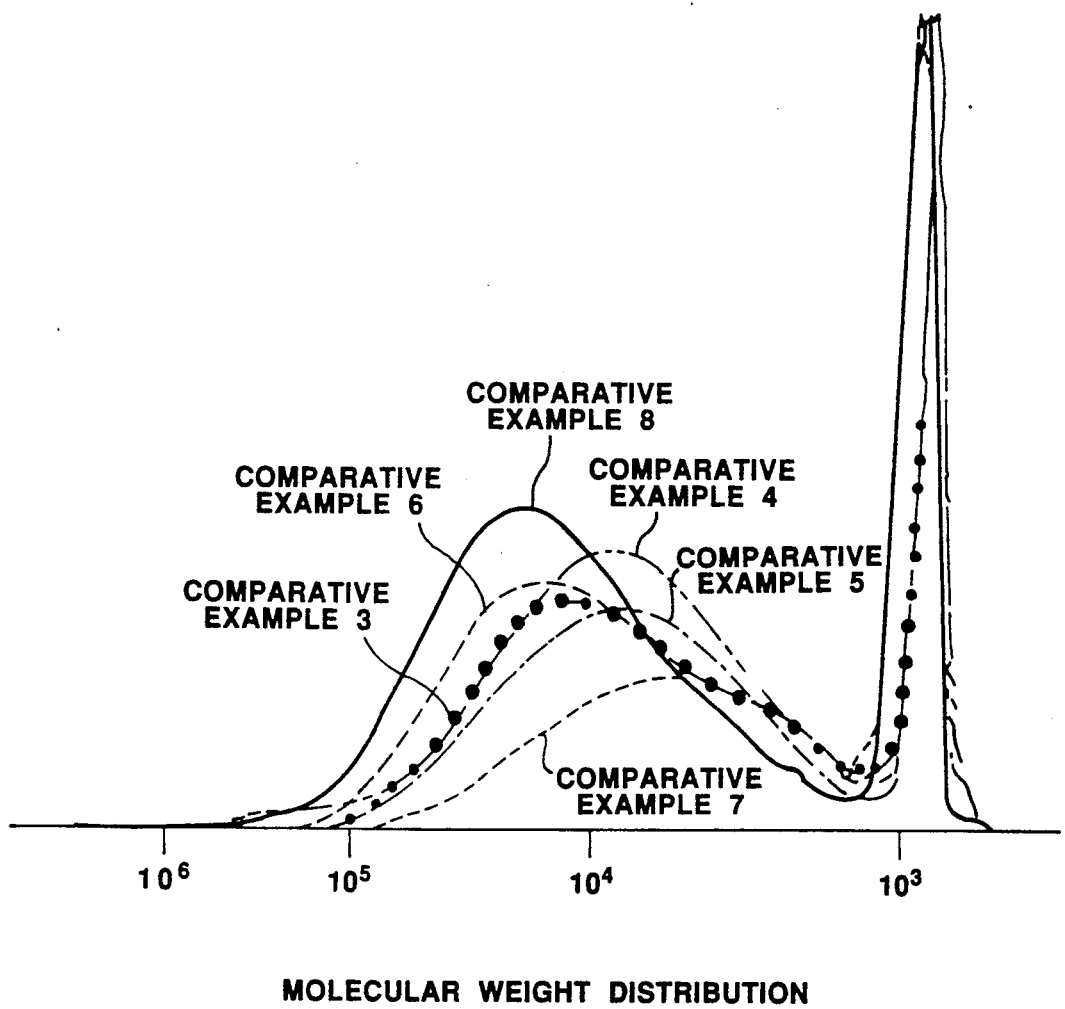
FIG. 3 is a chart showing the molecular weight distribution of polymers obtained in Comparative Examples 3-8.

Polysilanes were synthesized by the same procedure as in Example 6 except that the catalyst was omitted or replaced by 0.9% by weight of Fe(AcAc)$_3$, 0.7% by weight of Mn(AcAc)$_2$, 0.7% by weight of Zn(AcAc)$_2$, 0.7% by weight of Ni(AcAc)$_2$, and 0.8% by weight of Co(AcAc)$_2$. These synthesized polymers had molecular weight distributions as shown in FIG. 3. As is evident from FIG. 3, when organic metal compounds other than organic copper compounds were used as the catalyst, little polymers having a molecular weight in excess of 100,000 were obtained with no difference from the catalyst-free system (Comparative Example 3).

It is evident that high molecular weight polysilanes are synthesized in high yields by using organic copper compounds in reaction of dihalosilanes in the presence of alkali metals.

The present method insures simple synthesis of high molecular weight polysilanes in high yields while controlling formation of insoluble polymers.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for preparing a polysilane, comprising the step of
reacting a dihalosilane of the formula (1):

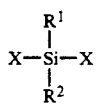
(1)

wherein R$^1$ and R$^2$ are independently selected from the group consisting of a hydrogen atom and a monovalent hydrocarbon group, and X is a halogen atom, in the presence of an alkali metal, and in the presence of a catalyst selected from the group consisting of copper powder, copper (I) oxide, and copper (II) oxide to form a polysilane of the formula (2):

(2)

wherein R$^1$ and R$^2$ are as defined above and n is an integer of at least 6.

2. A method for preparing a polysilane, comprising the step of:
reacting a dihalosilane of the formula (1):

(1)

wherein R$^1$ and R$^2$ are independently selected from the group consisting of a hydrogen atom and a monovalent hydrocarbon group, and X is a halogen atom, in the presence of an alkali metal, and in the presence of an organic copper chelate or carboxylic acid salt compound to form a polysilane of the formula (2):

(2)

wherein R$^1$ and R$^2$ are as defined above and n is an integer of at least 6.

3. The method of claim 1 wherein the reaction is carried out at a temperature of at least 100° C.

4. The method of claim 1 wherein the monovalent hydrocarbon group has 1-12 carbon atoms.

5. The method of claim 1 wherein the alkali metal is lithium or sodium.

6. The method of claim 1 wherein the alkali metal is used in an amount of from 2.0 to 2.5 mol per mol of dihalosilane.

7. The method of claim 1 wherein the copper catalyst is used in an amount of from $1 \times 10^{-6}$ to 10% by weight based on the weight of dihalosilane.

8. The method of claim 1 wherein the reaction is conducted in an inert solvent.

9. The method of claim 2 wherein the reaction is carried out at a temperature of at least 100° C.

10. The method of claim 2 wherein the monovalent hydrocarbon group has 1-12 carbon atoms.

11. The method of claim 2 wherein the alkali metal is lithium or sodium.

12. The method of claim 2 wherein the alkali metal is used in an amount of from 2.0 to 2.5 mol per mol of dihalosilane.

13. The method of claim 2 wherein the organic copper compound is used in an amount of from $1 \times 10^{-6}$ to 10% by weight based on the weight of dihalosilane.

14. The method of claim 2 wherein the reaction is conducted in an inert solvent.

15. The method of claim 2 wherein the organic copper compound is copper(II) bis(acetylacetonato).

* * * * *